United States Patent [19]

Kos

[11] 4,263,137
[45] Apr. 21, 1981

[54] APPARATUS AND METHOD FOR THE GRAVITY SETTLING OF SUSPENDED SOLIDS

[75] Inventor: Peter Kos, Ridgefield, Conn.

[73] Assignee: Dorr-Oliver Incorporated, Stamford, Conn.

[21] Appl. No.: 95,244

[22] Filed: Nov. 19, 1979

Related U.S. Application Data

[63] Continuation of Ser. No. 926,060, Jul. 18, 1978, abandoned.

[51] Int. Cl.³ .............................................. B01D 21/24
[52] U.S. Cl. .................................. 210/800; 210/520
[58] Field of Search ................ 210/83, 273, 343, 377, 210/417, 519–522

[56] References Cited

U.S. PATENT DOCUMENTS

| | | | |
|---|---|---|---|
| 1,754,119 | 4/1930 | Pink | 210/117 |
| 2,098,467 | 11/1937 | Sayers et al. | 210/55 |
| 2,304,248 | 12/1942 | Entwistle et al. | 210/519 |
| 2,343,836 | 3/1944 | Weber | 210/73 R |
| 2,947,380 | 8/1960 | Fullaway | |
| 3,314,547 | 4/1967 | Kivell | 210/520 |
| 3,456,798 | 7/1969 | Urdanoff | 210/73 |
| 3,534,861 | 10/1970 | Hubbell | 210/519 |
| 3,915,858 | 10/1975 | Condolios | 210/520 X |

FOREIGN PATENT DOCUMENTS

| | | | |
|---|---|---|---|
| 1280991 | 2/1961 | France | 210/519 |
| 1301189 | 12/1972 | United Kingdom | |
| 1376685 | 12/1974 | United Kingdom | |
| 1427953 | 3/1976 | United Kingdom | |

OTHER PUBLICATIONS

"Optimum Design of Straight Walled Diffusers", S. J. Kline et al., *The Journal of Basic Engineering*, p. 321, Sep., 1959.

*Primary Examiner*—William A. Cuchlinski, Jr.
*Attorney, Agent, or Firm*—Burtsell J. Kearns; Harold M. Snyder

[57] ABSTRACT

An apparatus and method for improving the settling out of suspended solids in a liquor are described. A diffuser of a particular type is used to introduce a liquor containing a flocculant suspension into a sedimentation tank with low turbulence. The diffuser is so shaped that the liquor velocity can be reduced in a controlled manner. Liquid shear conditions are made so low inside the diffuser that excessive break-up of flocs does not occur. The diffuser has a flare angle and a discharge opening to throat dimensional ratio whereby these conditions of low turbulence and formation can be established. Several embodiments of sedimentation apparatus employing such diffuser are described.

32 Claims, 27 Drawing Figures

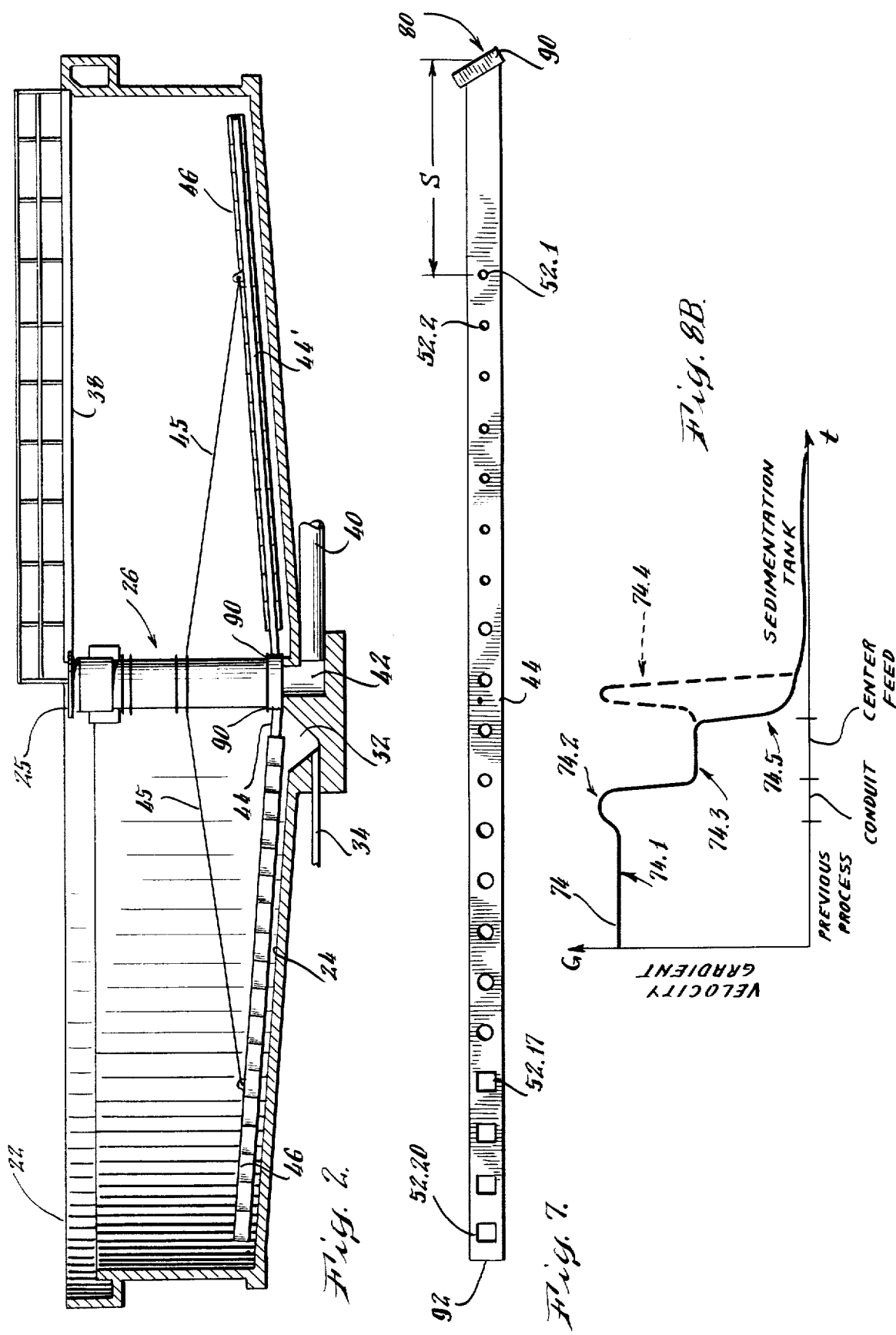

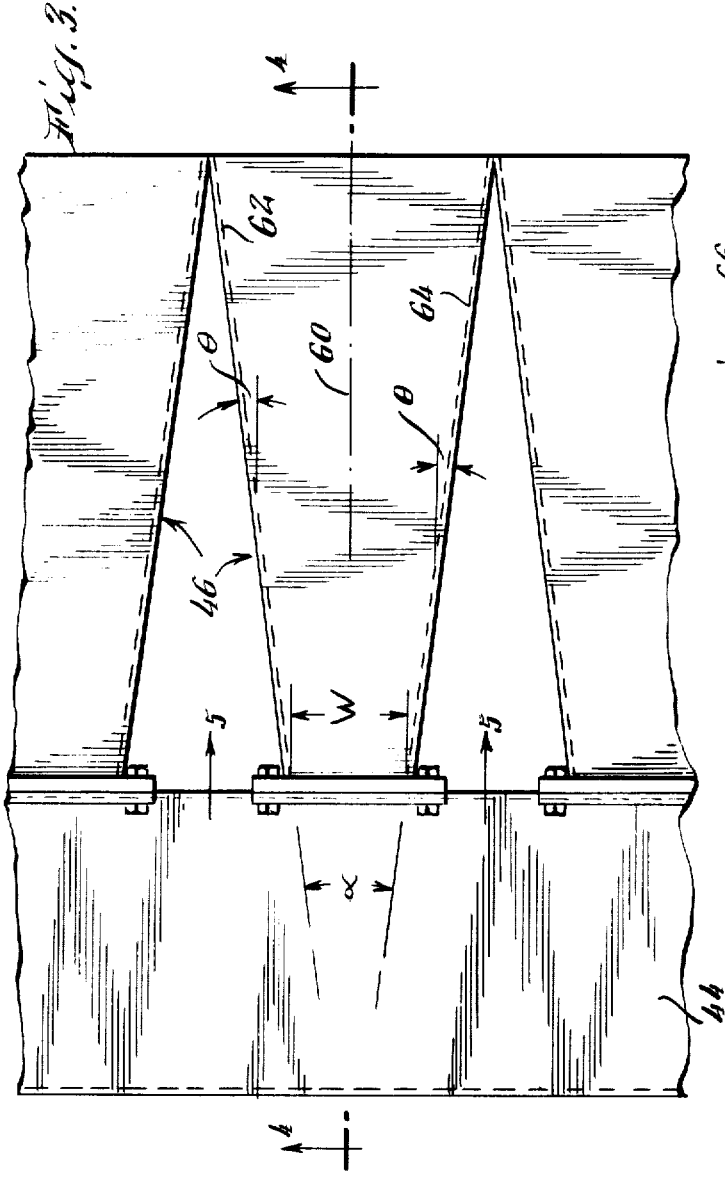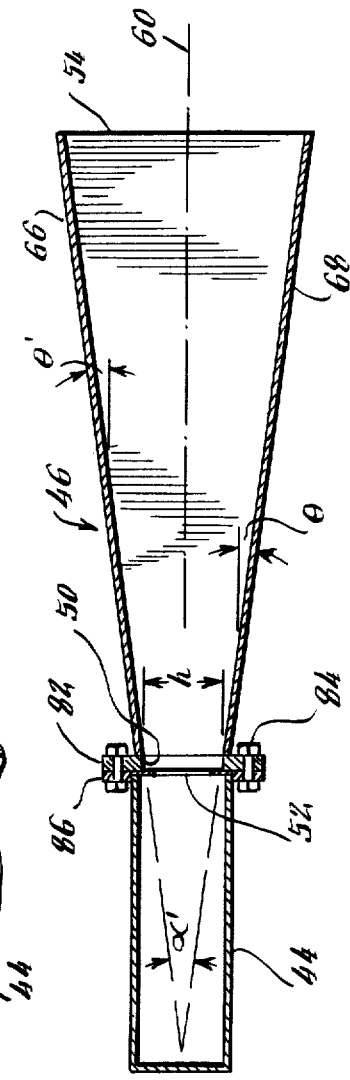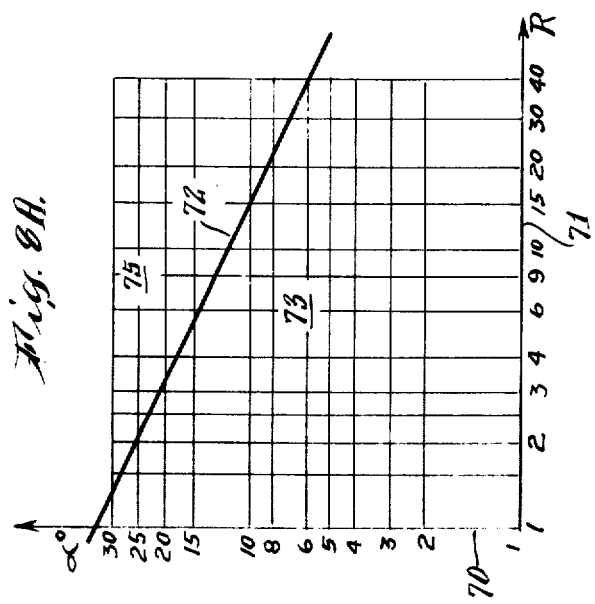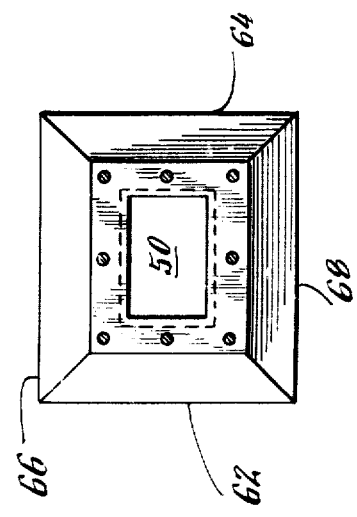

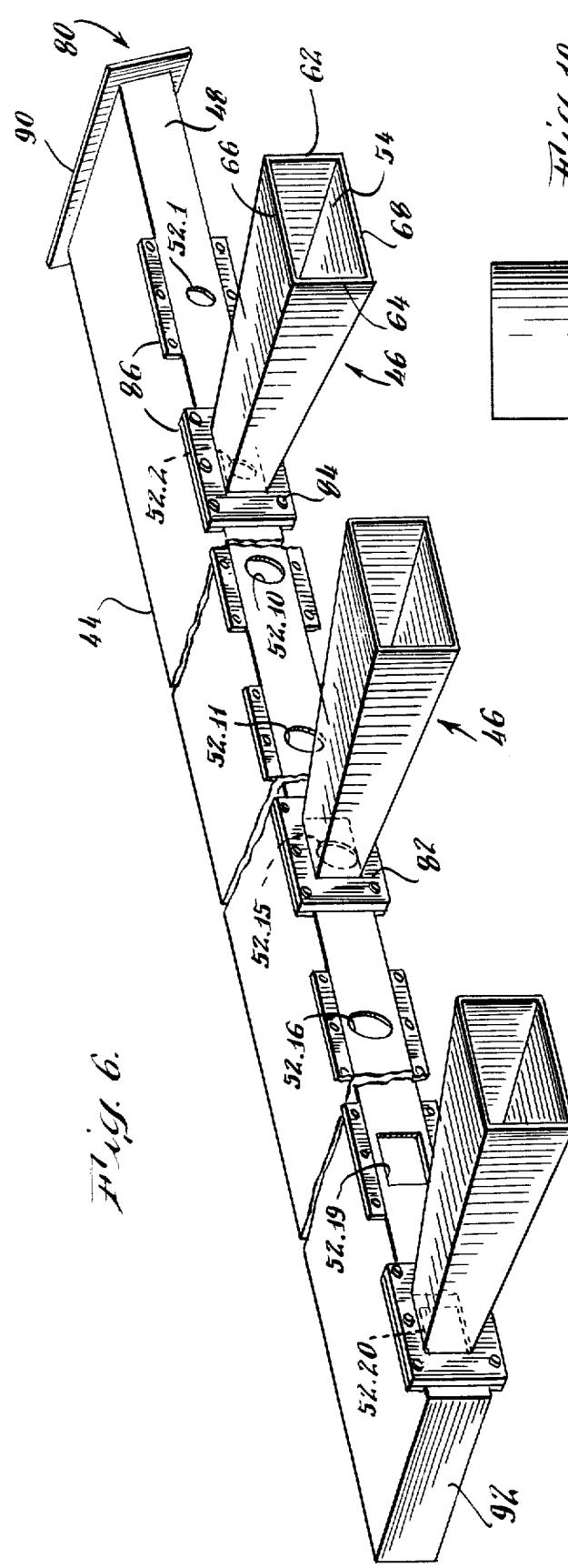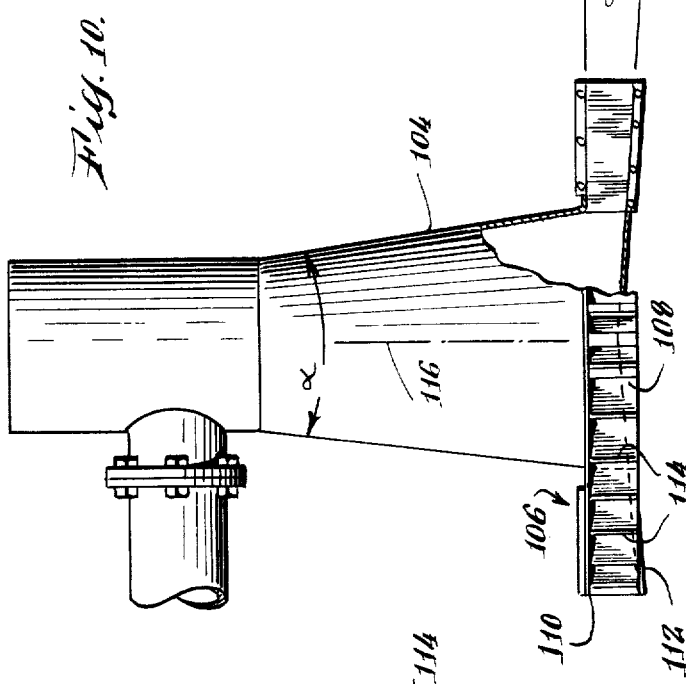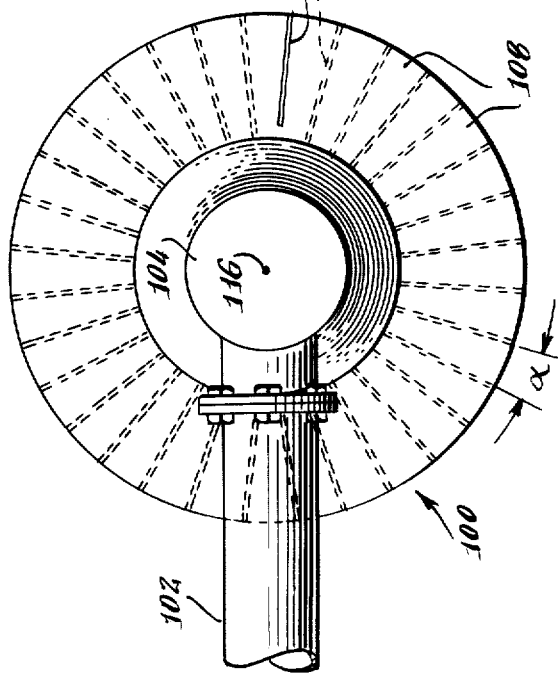

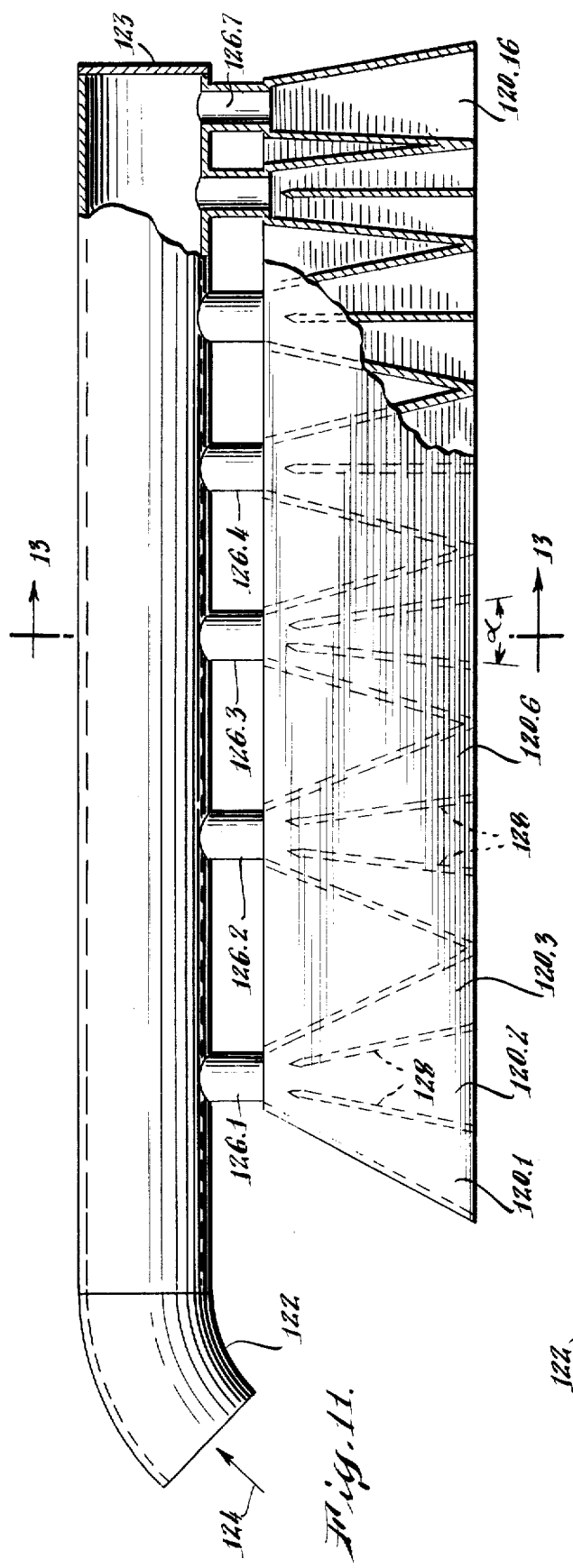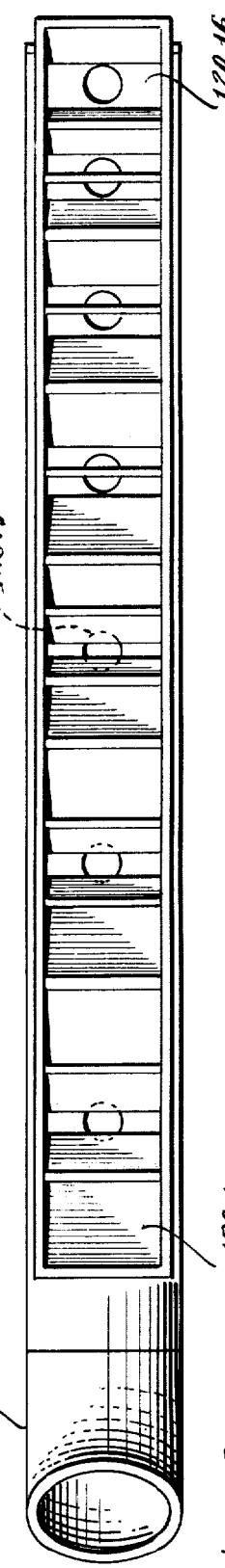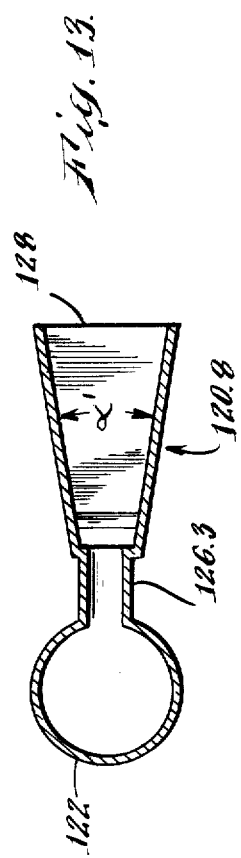

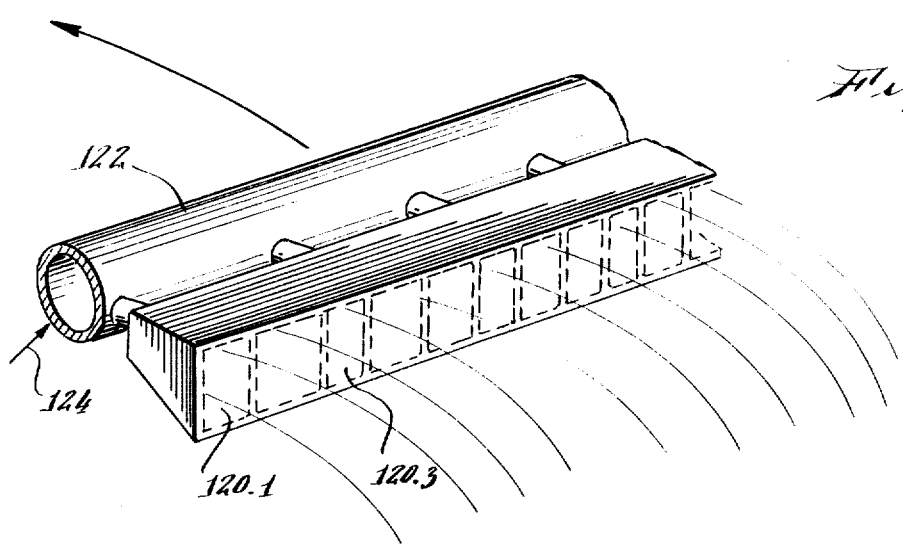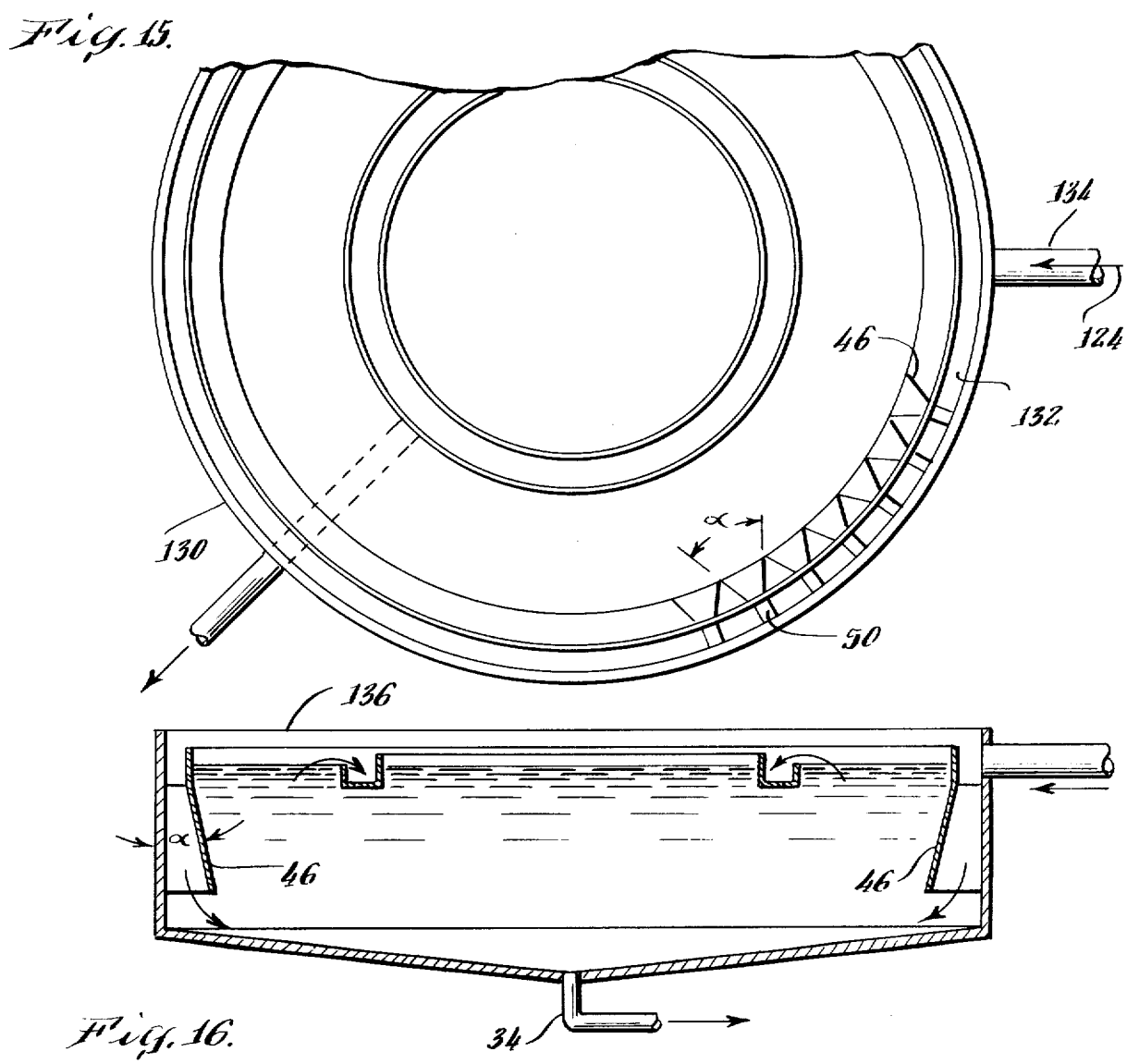

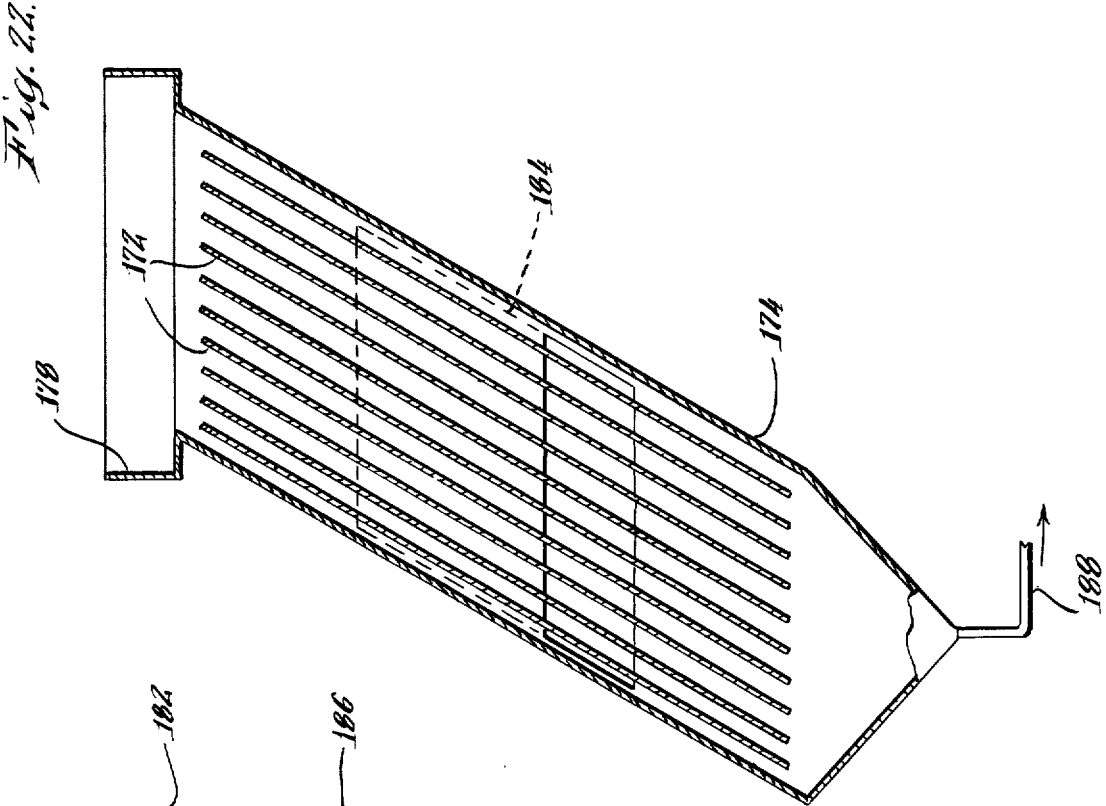
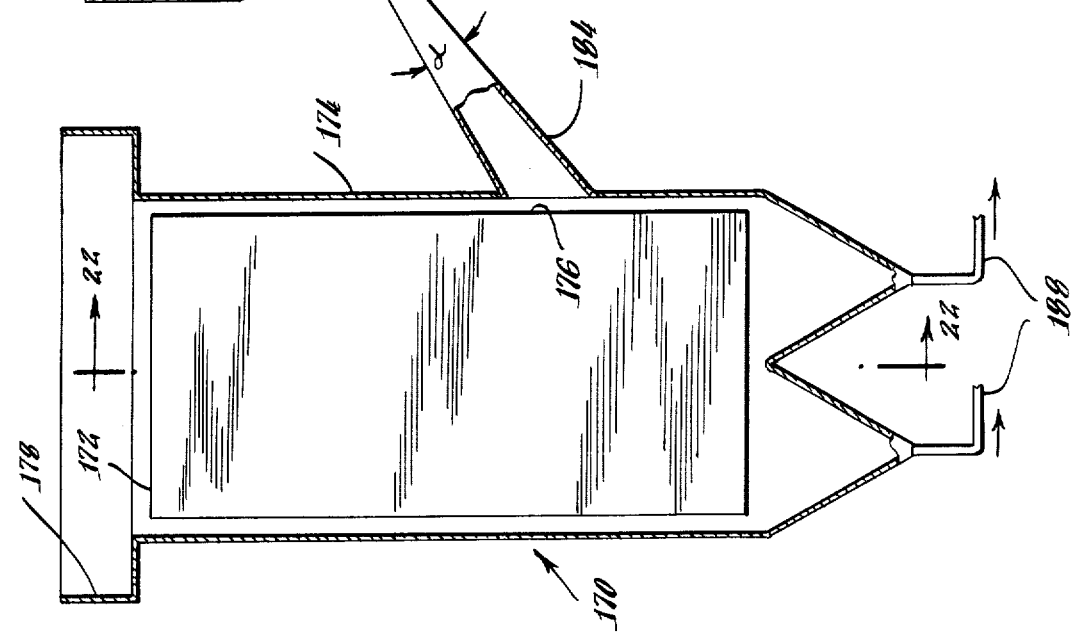

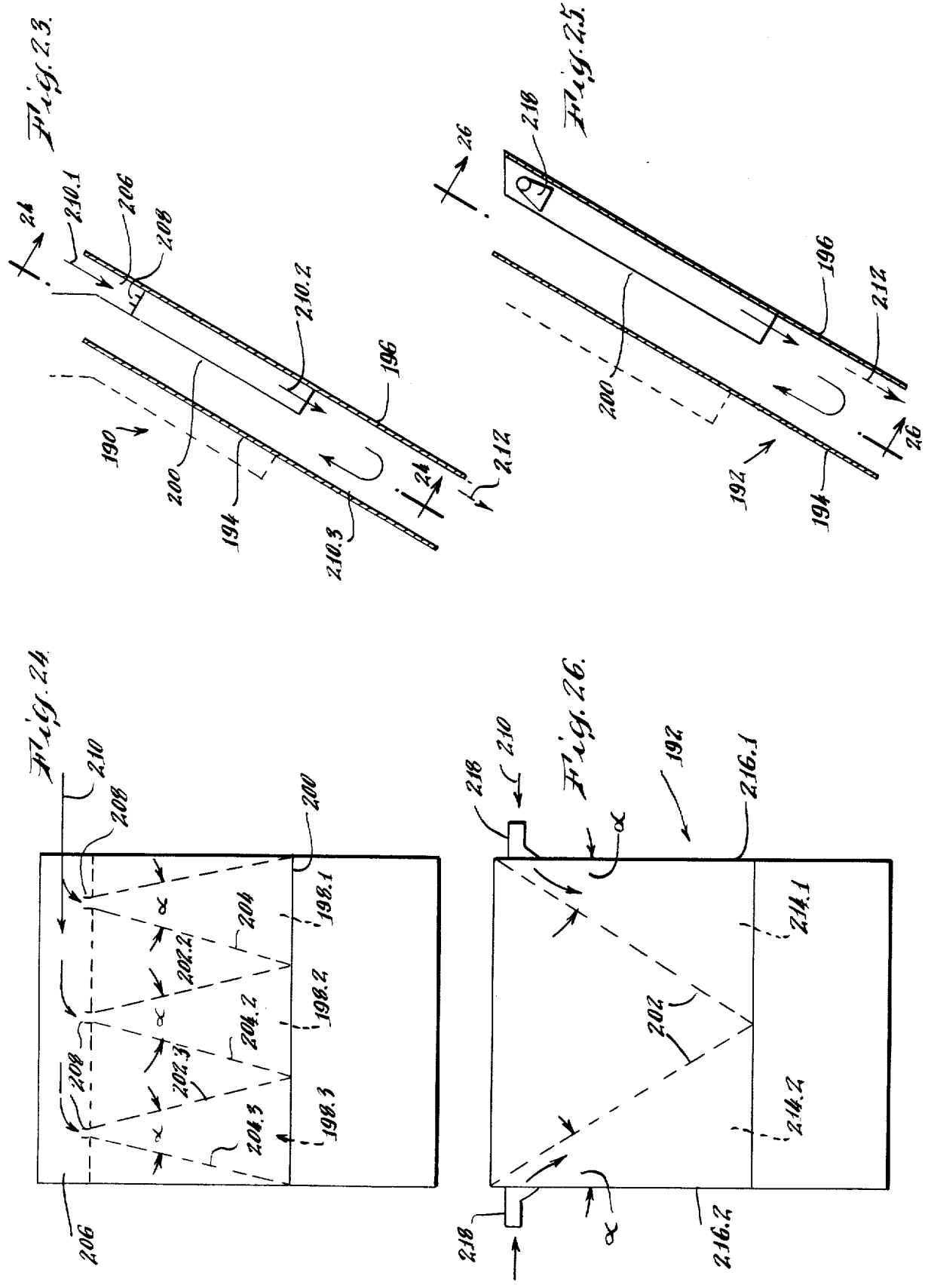

APPARATUS AND METHOD FOR THE GRAVITY SETTLING OF SUSPENDED SOLIDS

This is a continuation of application Ser. No. 926,060 filed July 18, 1978, now abandoned.

FIELD OF THE INVENTION

This invention relates to a method and apparatus for settling out of solids suspended in a liquid. More specifically, this invention relates to an improved technique for the gravitational removal or concentration of solids suspended in a liquid.

BACKGROUND OF THE INVENTION

The technology for settling of solids suspended in liquids has been extensively developed over a long time period. A description of a review of an 80 year history of the development of liquid clarifiers used in conjunction with water and sewage works can be found in an article entitled "The Sludge Blanket Clarifier" published in *Water and Sewage Works*, Vol. 97, No. 4 in April of 1950. A large variety of liquid clarifiers are described in this article for use in removing suspended solids. A more recent description of techniques and devices related to the separation of solids from a liquid can be found in *Chemical Engineering* in a desk book publication issue thereof on Feb. 15, 1971 in an article entitled "Thickening and Clarification", authored by Messrs. Dahlstrome and Cornell. Various solid settling techniques are discussed such as a thickener involving an underflow pumping arrangement, the use of special chemicals to enhance the formation of flocculents as well as improve thickener operations and several specific clarifier designs.

In the analysis of solid-liquid separation techniques, the solid suspensions are divided generally into two basic categories, a non-flocculent particulate and a flocculent suspension formed of flocs and primary particles. The flocculent suspension has the ability to agglomerate into flocs also known as agglomerates, while the non-flocculent particulate is not able to do so. Some suspensions are naturally flocculent and create the flocs or agglomerates without any additives. Other suspensions require some chemical aid in order to coagulate and flocculate into flocs. These aids may be inorganic salts such as alum, ferric chloride or an organic material known as polyelectrolytes.

When gravity settling is used for the solid-liquid separation of the non-flocculent particulate, the sedimentation tank performance depends upon the hydraulic loading of the tank. Non-flocculent particles larger than a certain critical diameter settle completely for a given hydraulic load. Smaller non-flocculent particulates are removed only partially, depending upon the ratio of the settling velocity and the hydraulic loading.

It is well known and accepted that the sedimentation of flocculent matter depends upon a flocculation process. The flocculation process makes the agglomeration of small particles and small flocs into larger flocs possible and thus enables solids to settle under given conditions. In order to optimize the settling out of flocculent suspensions above a particular size, the traditional technique involves control over the hydraulic loading of the tank and the theoretical detention time of the liquid as it passes through the tank. Hydraulic loading specifications are defined so that flocs above a certain size will settle out and these specifications then determine the area of the tank. The detention time is set to allow small primary particles and fine flocs to reflocculate into larger settlable flocs. Such reflocculation is essential for efficient separation of flocculent suspensions.

The state of a flocculent suspension is dependent upon two processes: flocculation and break-up of flocs. These two processes act simultaneously. When the turbulence in the suspension is high, the rate of break-up dominates over the rate of flocculation. The resulting flocculent suspension is in the form of fine flocs and primary particles. However, when the turbulence (which can be expressed as an average velocity gradient, G) is low, the flocculation process dominates and larger settleable flocs are created. Both the rate of flocculation and break-up are directly dependent upon the concentration of suspended solids and the average velocity. gradient. The net rate of decrease in the amount of primary particles can be expressed by the relationship $$(dn_1/dt) = -K_a \cdot Y \cdot n_1 \cdot G + k_b \cdot Y \cdot G^m$$

where
$K_a$ = aggregation rate coefficient
$Y$ = suspended solids concentration
$n_1$ = primary particle concentration
$t$ = time
$G$ = velocity gradient
$K_b$ = floc break-up rate coefficient
$m$ = floc break-up rate exponent.

From the above relationship one may appreciate that in order to optimize the performance of a sedimentation tank, such as may be used as a clarifier or thickener, it is essential to control the flocculation of the flocculent suspension by controlling the velocity gradient, G. This may be understood in describing the conditions prevailing in a sedimentation tank.

For example, an activated mixed sludge liquor, which is brought into a final clarifier from an aeration basin, includes both non-flocculent particulate and a flocculent suspension formed of small flocs and primary particles produced from the highly turbulent conditions in the basin which G could be well over 150 sec$^{-1}$ (meters/sec —meter). Such turbulence is necessary for efficient oxygen transfer but the small flocs and primary particles need to reflocculate into larger agglomerates to settle them in the final clarifier tank. During the passage of the liquor from the aeration basin to the clarifier sedimentation tank, some reflocculation of small primary particles and flocs may occur. Such reflocculation is enhanced if the velocity gradient of the liquor in its travel through the conduits,, from the aeration basin and the feed well leading into the clarifier drops to a level where the rate of break-up of flocs is exceeded by the rate of flocculation. If flocculation is permitted to increase, the liquor arrives in the clarifier with larger flocs and less primary particles to thus enhance the removal efficiency of the clarifier.

The precise range of values of G in which the flocculation process dominates over the break-up of flocs may vary depending primarily upon material. One may judge from an article entitled "Physical Conditioning of Activated Sludge Floc" by D. S. Parker, W. J. Kaufman and D. Jenkins, published in *The Water Pollution Control Federation Journal* of September 1971 at pages 1817–1833, that at values of G generally below 30–40 sec$^{-1}$ the flocculation process is dominant.

On the other hand, if the mixed liquor along its travel path from the aeration basin to the clarifier sedimentation tank encounters an increase in the velocity gradient, a break-up of flocs tends to occur resulting in a lower removal efficiency of the clarifier. Such an increase in the velocity gradient usually occurs at the entrance to the sedimentation tank, causing high velocity gradients in the region inside and around the entrance of the tank. It is thus desirable that the kinetic energy of the incoming liquor is dissipated without a break-up of flocs.

A variety of feeding arrangements have been proposed to dissipate kinetic energy of incoming liquor. For example, with reference to an early 1930 U.S. Pat. No. 1,754,119 to S. Pink, an apparatus for separating liquids of different densities is described. The incoming liquor is applied through cones fed from an inlet conduit into a settling tank. The cone angles are described to serve the function of reducing the incoming velocity of the liquid before it actually gets into the separating tank. The speed reduction described may be from 150 feet per minute down to 2 feet per minute at the place where the liquor enters the sedimentation tank. The cones are described as having a circular cross-section though rectangular designs may be employed with the flare angle to be of any suitable magnitude.

In the U.S. Pat. No. 2,098,467 to Sayers, et al, a diffuser is associated with a settling tank and interposed between an inlet conduit and a tank. The diffuser reduces the velocity of the incoming liquor to improve distribution. The diffuser is employed in conjunction with a vortex generating apparatus, which not only creates a vortex motion of the liquor, but also causes the liquor to spread and diffuse laterally across the tank from the top to avoid direct flow of liquor from the fluid's point of entry of the tank outlets. The presence of the vortex elements introduces shear forces on the incoming liquor, thus tending to break up flocs.

In the U.S. Pat. No. 2,343,836 to Webber, a nozzle is described to introduce liquid into a clarifier tank in such manner that the velocity of the liquid flow relative to a set of paddles is of the order of 90 feet per minute. The velocity of the liquid introduced into the settling tank tends to create highly turbulent conditions, thus increasing the break-up of flocs rather than their formation.

In the U.S. Pat. No. 2,947,380 to Fullaway, an introductory passageway is described whose cross-sectional size constantly increases so that the influent liquor encounters a constantly and gradually decreasing velocity.

In a more recent U.S. Pat. No. 3,456,798, a diffuser is described for introducing influent liquor into a clarifier tank. The diffusers described are best illustrated with reference to the '798 patent's FIGS. 7 and 8 wherein slot openings of gradually changing dimensions are shown. These slots are asserted to establish an essentially constant entrance velocity of the liquid into the reservoir. The liquid is introduced into the reservoir at a velocity which may be in the range from 6 to 240 feet per minute, but preferably is in the range from about 30 to 60 feet per minute.

With these diffusers and devices as described in the aforementioned patents, a velocity reduction of the incoming liquor can be achieved but not necessarily without shear conditions tending to break up flocculations. For example, the mere use of a diffuser to introduce liquor into a sedimentation tank does not assure that the velocity gradient (G) of the liquor is in the range where the flocculation process is dominant. Hence, the incoming stream of liquor may extend well into the sedimentation tank where the dissipation of the stream's kinetic energy is accompanied by turbulence and high shear forces tending to break flocs apart.

As noted with the above relationship for the reduction of primary particles, the flocculation process depends upon the concentration of suspended solids. When an incoming liquor is introduced in a sedimentation tank, a substantial dilution takes place resulting in a substantial reduction of the concentration of suspended solids. Such dilution impedes the flocculation process and is, therefore, preferably avoided.

Submerged inlet techniques have been described in the art to introduce the incoming liquor into a sedimentation tank in such manner that the effect of the above dilution upon the flocculation process is reduced. One such technique may be as described with respect to so-called up-flow clarifiers where the influent liquor is introduced at the bottom of the tank below a blanket of flocs through which the liquor must travel. Although the presence of the blanket enhances the formation of flocs, such up-flow clarifiers are sensitive to flow fluctuation and have limited applications.

SUMMARY OF THE INVENTION

With a gravitational sedimentation technique in accordance with the invention, the incoming liquor is introduced in a sedimentation tank in such manner that the flocculation process may dominate throughout the region where the incoming liquor enters and is dispersed throughout the tank. This is accomplished by employing a diffuser of a particular type whereby the kinetic energy of the incoming liquor can be recovered (converted to potential energy) within the diffuser, but without the occurrence of such turbulence as would cause a dominance of the break-up of flocs.

As described with reference to a preferred form of the invention, a diffuser is employed with a fully enclosing wall which diverges from an inlet to a discharge opening. The angle by which the diffuser wall diverges is referred to herein as a flare angle, i.e. the angle measured between opposing segments of the diffuser wall. The size of the discharge opening is selected so that its cross-sectional area exceeds that of the inlet by an amount sufficient to achieve a substantial reduction of the flow rate of the incoming liquor over the length of the diffuser. The ratio of the length of the diffuser with respect to a characteristic dimension of the inlet is so selected together with the flare angle to produce a flow regime within the diffuser without appreciable stall and avoid turbulence within the diffuser while enabling a controlled dispersal of the incoming liquor into the sedimentation tank effectively with a dominant flocculation forming process.

With a diffuser in accordance with the invention, the velocity of the liquor as it enters the sedimentation tank can be made extremely low. For example, as described with reference to one form for a sedimentation apparatus in accordance with the invention, a radial settling tank is used. Such tank employs a rotating mechanism which rakes settled solids usually in a generally circumferential direction to a central collector. The rotating mechanism is provided with a supply duct on which a plurality of diffusers are mounted to discharge the incoming liquor in a direction opposite the direction of rotation. Since the incoming liquor is slowed downed in the diffusers, the velocity of the liquor relative to the tank is further reduced by virtue of the rotational movement of the rotating mechanism. As a result, the incoming liquor is introduced into the tank in a controlled gentle manner with a very low velocity gradient, thus preserving a dominant flocculation process. When the diffusers in accordance with the invention are so mounted and oriented to discharge the liquor near the tank bottom within the blanket of flocs, the increased concentration of solids further enhances the effectiveness of the sedimentation apparatus.

It is, therefore, an object of the invention to provide a technique for introducing a liquor into a sedimentation apparatus with low shear so that the process of flocculation predominates over the break-up of flocs throughout the feed and sedimentation regions of the sedimentation apparatus. It is a further object of the invention to provide a sedimentation apparatus with which the liquor can be introduced into a tank in a controlled manner with low shear conditions and a high concentration of suspended solids.

These and other advantages and objects of the invention can be understood from the following description of several embodiments described with reference to the drawings.

BRIEF DESCRIPTION OF DRAWINGS

FIG. 2 is a section view of the apparatus of FIG. 1 taken along the line 2—2 in FIG. 1.

FIG. 3 is an enlarged plan view of several diffusers in accordance with the invention for use in the sedimentation apparatus of FIG. 1.

FIG. 4 is a vertical section view of a diffuser in accordance with the invention taken along the line 4—4 in FIG. 3.

FIG. 5 is a vertical section view of a diffuser in accordance with the invention taken along the line 5—5 in FIG. 3.

FIG. 6 is a perspective broken view of a portion of the feed assembly used in the sedimentation apparatus of FIG. 1.

FIG. 7 is a side view of a supply duct used in the sedimentation apparatus of FIG. 1.

FIG. 8A is a diagram for defining limits of dimensional parameters of a diffuser in accordance with the invention for use in a sedimentation apparatus.

FIG. 8B is a plot of the velocity gradient G as a function of time and different places in a process for clarifying water and removal of suspended solids.

FIG. 9 is a top plan view of a central feed apparatus in accordance with the invention for use in a settling tank.

FIG. 10 is a side view and partial section in elevation of the central feed apparatus shown in FIG. 9.

FIG. 11 is a top plan view in partial section of another feed arrangement in accordance with the invention for a settling tank.

FIG. 12 is a side view in elevation of the feed arrangement shown in FIG. 11.

FIG. 13 is a vertical section view of a diffuser used in the feed arrangement of FIG. 11 taken along the line 13—13 in FIG. 11.

FIG. 14 is a partial perspective view of the feed portion shown in FIG. 11.

FIG. 15 is a partial top plan view of another form for a sedimentation apparatus in accordance with the invention wherein diffusers are distributed around the periphery of a tank.

FIG. 16 is a section view of a sedimentation apparatus employing a downwardly oriented diffuser in accordance with the invention.

FIG. 21 is a vertical schematic section view of a lamella type clarifier with a diffuser in accordance with the invention.

FIG. 22 is a vertical section of the lamella clarifier shown in FIG. 21 and taken along the line 22—22 in FIG. 21.

FIG. 23 is a vertical section view of a lamella section incorporating a liquor feed arrangement in accordance with the invention.

FIG. 24 is a view of the lamella section of FIG. 23 taken along the line 24—24 in FIG. 23.

FIG. 25 is a vertical section view of a lamella section employing another form of a liquor feed arrangement in accordance with the invention.

FIG. 26 is a view of the lamella section of FIG. 25 taken along the line 26—26 in FIG. 25.

DETAILED DESCRIPTION OF EMBODIMENTS

Figure 1:
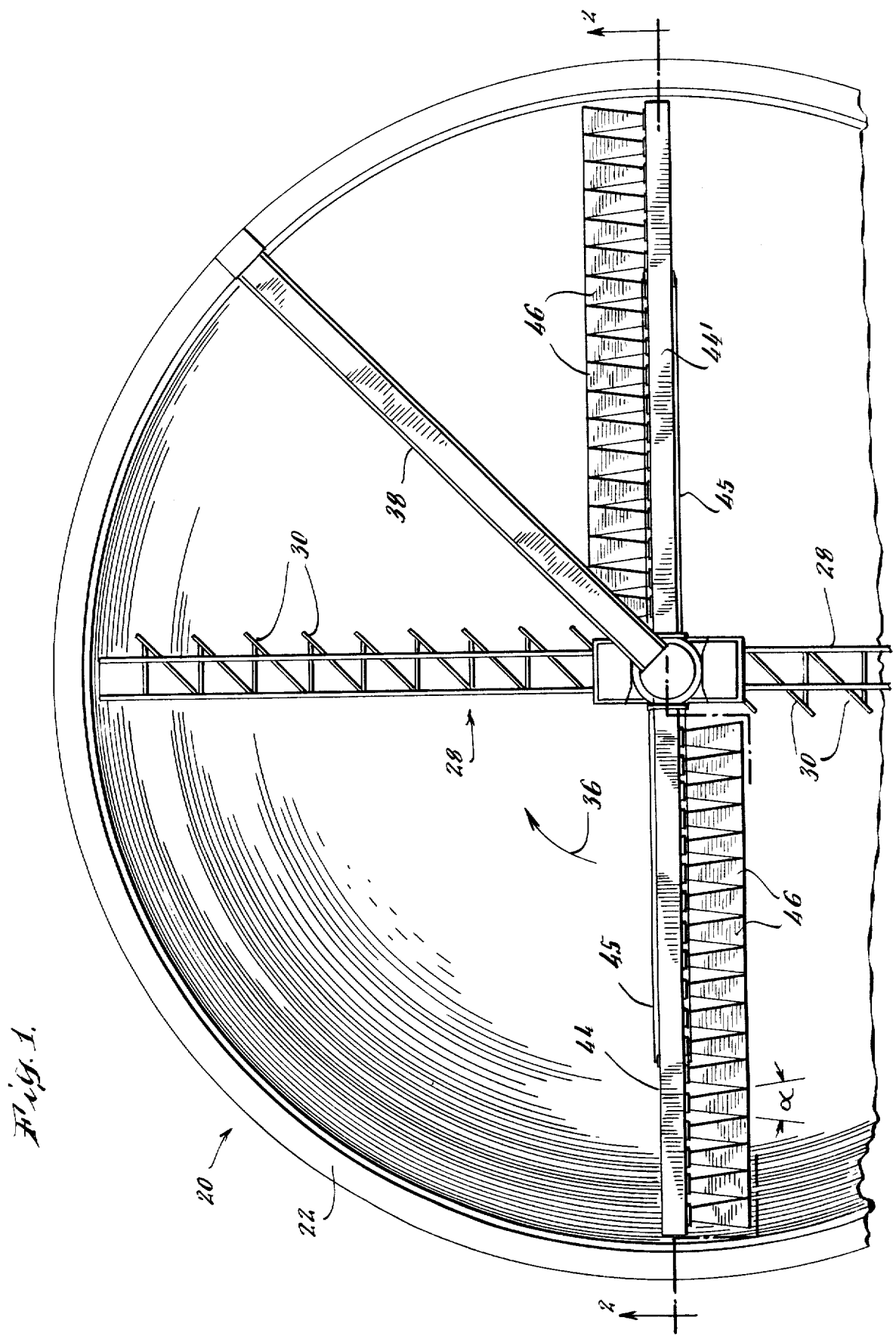
FIG. 1 is a partial plan view of a gravitational sedimentation apparatus in accordance with the invention.

With reference to FIGS. 1 and 2, a sedimentation apparatus 20 in accordance with the invention is shown. The apparatus 20 includes a circular tank 22 having a sloped bottom 24. A stationary center pier 25 supports a rotating center mechanism 26 from which rake arms 28 extend in radial directions with rakes 30. The rakes 30 are oriented to scrape settled solids in a spiral pattern towards a central effluent discharge 32 and conduit 34. The center mechanism 26 is mounted for rotation in a direction indicated by arrow 36 with a suitable motor drive in a manner as is well known in the art. A bridge 38 is provided across tank 22 to pier 25.

Incoming liquor is supplied through a supply conduit 40 to a central feed 42 which is in hydraulic communication with a pair of radially extending feed ducts 44—44′ suspended with cables 45 a small distance above the tank bottom 24. The feed ducts 44 are provided with a plurality of diffusers 46 which are oriented to discharge liquor opposite to the direction of rotation 36 of the center mechanism 26.

In the embodiment of FIGS. 1-7, the diffusers 46 are all of equal size and are mounted side by side to provide an even discharge of liquid from ducts 44 across the tank bottom 24. As shown in FIG. 6, the diffusers 46 are affixed to side 48 of ducts 44 to place diffuser inlets 50 opposite outlet orifices 52 in the side 48 of ducts 44. Since the tank bottom 24 area increases radially from the center pier 25, the duct outlets 52 are selectively sized so that liquor from the diffuser discharge openings 54 is generally uniformly distributed over the tank bottom 24.

The diffusers 46 each have a rectangular cross-section and are formed with a wall 56 which diverges from rectangular inlet 50 to the diffuser opening 54. The flare angle by which wall 56 diverges is measured relative to the direction liquor is guided such as the straight feed axis 60 for diffusers 46. Since the overall divergence of wall 56 is to be carefully controlled, the flare angle α, as measured at a projected intersection of opposing side wall segments such as 62-64, is used as a controlled parameter of diffuser 46.

The flare angle α can be viewed as twice the divergence angle θ that each side wall segment 62 or 64 makes with respect to a central feed axis 60 of diffuser 46.

In a diffuser 46 the wall 56 is rectangular in cross-section with opposite side wall segments 62, 64 and vertical wall segments 66, 68. The latter segments 66-68 diverge with the same flare angle α' as between side wall segments 62, 64; however, this latter flare angle α' may if needed differ from flare angle α.

In the selection of design criteria for diffuser 46, it is essential that the liquor is slowed at the discharge end 54 to a very low velocity whereby its kinetic energy can be absorbed within the tank 22 without high turbulence (low velocity gradient). It is further essential that the speed reduction of the liquor within the diffuser 46 is obtained substantially without such turbulence as would cause the break-up of flocs to dominate the formation of flocs. In effect, therefore, the kinetic energy of the incoming liquor is converted to a potential energy in a uniform manner.

This is accomplished for diffuser 46 by selecting preferably the largest acceptable flare angle α between opposing wall segments and the ratio, R, of the length L of wall 56 to a characteristic dimension of inlet 50. This latter dimension may be the width w or height h of rectangular diffuser inlet 50. For a conservative design, the smaller throat dimension is used. In the case of a conically shaped diffuser having a circular inlet, the characteristic dimension can be the radius of the inlet 50.

For a diffuser 46 in accordance with the invention, the flare angle α and ratio R are interrelated in a manner as described in an article entitled "Optimum Design of Straight-Walled Diffusers" by S. J. Kline, D. E. Abbott and R. W. Fox and published in *The Journal of Basic Engineering* at page 321 of its September 1959 issue. FIG. 1 of this article is partially reproduced in FIG. 8A herein to illustrate a region of values for the flare angle α and the ratio R in accordance with which diffuser 46 can reduce the velocity of the incoming liquor substantially without turbulence.

The diagram of FIG. 8A is made on a log-log graph. The variation of the flare angle α is in degrees along the ordinate 70 and the ratio R varies along the abscissa 71. A boundary in the form of a straight line 72 is shown below which in an area 73 there exists a flow regime through the diffuser without appreciable stall or separation of the liquid stream from wall 56 and where the kinetic energy of the incoming liquor can be recovered. For example, if the ratio R is selected as 4, then the flare angle α should not exceed about 16 degrees to preserve a very low turbulence flow through diffuser 46.

Above the boundary 72 exists a flow regime which increases in turbulence away from boundary 72. The precise location or boundary 72 may vary, but generally as the flow regime occurs deeper in region 75, a transition flow regime occurs whereby increasing turbulence is encountered. For example, as described in the aforementioned Kline et al article, the flow regime, as one moves deeper into region 75, is characterized by a pulsating flow, then a region of fully developed stall identified by a highly turbulent recirculation region while the main flow of liquor follows one wall continuously, until in an extreme region, the main flow establishes itself as a pronounced jet separated from the diffuser walls with highly turbulent conditions around the jet. Since these flow regimes are accompanied with turbulent conditions tending to break up flocs, these regimes are preferably avoided and the region 73 having a flow regime characterized by its low turbulence without appreciable stall is selected.

As a practical example, the dimensions for diffuser 46 are selected on the following basis. Assume that the average volume of the liquor flow as required for the sedimentation apparatus 20 is set according to well-known considerations in the sizing of such devices. The cross-section of ducts 44 are selected to preserve or decrease the velocity of the liquor flow in a controlled manner with as low turbulence as appears practical. The sizing of outlet orifices 52 in ducts 44 are then determined in accordance with well known hydraulic flow relationships to provide outlet orifices 52 with such dimensions that the liquor can be uniformly distributed over the tank bottom 24. Techniques for sizing of orifices 52 are well known in the art.

Once the ducts, cross-sections and outlet orifice sizes have been determined, one can derive an average velocity of the liquor as it enters inlets 50 of diffusers 46. From this velocity value one can determine the liquor velocity reduction required by the diffusers 46 to achieve a gentle dispersal of the liquor from diffuser discharge openings 54 into tank 22. This velocity reduction should take the rotational velocity of ducts 44 into account to provide as low as possible a liquor velocity relative to tank bottom 24. A target velocity relative to the tank bottom may be zero, though higher values generally up to about four inches per second can be tolerated depending upon the material.

The specific dimensions of diffusers 46 can be derived on the basis of the desired liquor velocity reduction and the fact that the diffuser inlet 50 must be at least as large as the largest duct outlet orifice 52. In the example illustrated for FIGS. 1-7, the average velocity reduction factor is approximately seven so that the area of the diffuser discharge opening 54 is about seven times that of the area of inlet 50. This can be achieved by selecting the diffuser discharge opening 54 dimensions such that they are larger than corresponding dimensions of the diffuser inlet 50 by a factor equal to the square root of the desired liquor velocity reduction. If the desired velocity reduction is about 7, then the diffuser discharge opening dimensions must be each about 2.6 times larger than corresponding dimensions of the diffuser inlet 50.

The length L of the diffuser wall 56 needed to provide the desired diffuser discharge opening 54 depends upon the acceptable flare angle α. If L is made very short, say, as long as twice the width w of the diffuser inlet 50, then the Ratio R is 2, but the divergence angle θ is about 40° and thus the flare angle about 80°. At such flare angle, one can observe from the diagram in FIG. 8A that the operation of diffuser is above the boundary 72 in an undesirable high turbulence region.

Accordingly, the length L of diffuser wall 56 is made longer, to yield a maximum ratio R (L/h) of about 7.5 and a flare angle α of about 15° with a divergence angle θ of about 7½°.

The advantage of a diffuser having the desired flare angle and ratio R limitations can be appreciated with reference to FIG. 8B in which the velocity gradient, G, is plotted as a function of time and the devices through which the liquor with its suspended solids flows.

Curve 74 shows a relatively high value, of the order of 128 sec$^{-1}$, G at 74.1 where, for example, the liquor is undergoing a highly turbulent aeration process tending to break up most of the flocs. As the liquor is drawn from the aeration basin into conduits, there is an initial increase in the velocity gradient at 74.2, but then drops at 74.3 to a lower level, of the order of about less than 40 sec.$^{-1}$, inside the conduits leading to the sedimentation tank and thus permits flocs to accumulate.

A significant increase in the velocity gradient occurs at 74.4 in and around the feed well commonly used to introduce liquor into the sedimentation tank. Although the increase in the velocity gradient occurs over a short interval, the shear forces tend to be high causing a significant amount of break-up of flocs.

When a diffuser 46 in accordance with the invention is used, the increase in the velocity gradient such as at 74.4 and normally encountered when the liquor is introduced into the settling is avoided. Instead, the velocity gradient is sharply reduced at 74.5 to a very low level, thus preserving previously formed flocs and improving the efficiency of the settling tank.

A diffuser 46 may have various flare angles α and ratios R depending upon the particular conditions. As can be seen from FIG. 8A, if the flare angle is high, i.e. about 30°, then the ratio R must be low of the order of 1.5. This means that the diffuser's ability to provide a significant velocity reduction without turbulence is reduced because the diffuser's discharge opening area exceeds that of the inlet by only a small factor of about 3.

When a smaller flare angle is employed, a longer diffuser can be used. But if the flare angle is too small, the diffuser length may become excessive in order to achieve a desired velocity reduction. Generally then, the flare angle α for a diffuser in accordance with the invention is less than about 30° and the ratio R may be in the range from about 1 to about 40. A preferred range for the flare angle α is between about 20° to about 10° with corresponding values for ratio R between about 3 and 10.

Stated in a different manner, a diffuser in accordance with the invention has a flare angle with a ratio R of such values that they remain generally below a boundary such as straight line 72 as drawn on a full logarithmic plot between a pair of boundary points defined as α=32°, R=1 and α=6°, R=40. This boundary line 72 may be exceeded for some diffusers depending upon particular materials and flow conditions. Also the boundary line 72 is generally intended for straight walled diffusers and some adjustment of the boundary line 72 locatin may have to be made when diffusers of different shapes are contemplated.

As an example of specific design values, FIG. 7 shows a key plan for the outlet orifices 52 in ducts 44. The sizes of these orifices are set forth below in Table 1.

TABLE 1

| Outlet Orifices | Size - Diameter | |
|---|---|---|
| 52.1–52.4 | 4" (10.16 cm) | |
| 52.5–52.7 | 4.5" (11.43 cm) | Duct internal cross-section |
| 52.8–52.9 | 5" (12.7 cm) | is rectangular 7" (17.78 cm) |
| 52.10–52.11 | 5.5" (13.97 cm) | |
| 52.12–52.16 | 6" (15.24 cm) | |

TABLE 1-continued

| Outlet Orifices | Size - Diameter |
|---|---|
| 52.17–52.20 | Rectangular 6" high × 7.375" wide (15.24 cm × 18.73 cm) |

The outlet orifices are equally spaced from each other with spacings between centers of 2 feet and ⅜" (slightly greater than the width of the vertical wall segments 66, 68 of the diffuser discharge openings 54). The first outlet orifice 52.1 is spaced eight feet from the inlet 80 of ducts 44.

The diffusers 46 are mounted to the ducts 44 with flanges 82 and suitable bolts 84 sized to engage corresponding flanges 86 on ducts 44. A flange 90 is mounted at the inlet 80 of each duct 44 with an inclination corresponding to that of the sloped tank bottom 24 so that ducts 44 can be mounted to center mechanism 26 and parallel to tank bottom 24. Ends 92 of ducts 44 are closed.

The diffusers 46 are shown with rectangular cross-section and of equal size. It should be understood, however, that the diffusers may have a conical cross-section and be of different sizes to match the diffuser inlets 50 to the duct outlet orifices 52.

The difference in size between the diffuser 46 inlets 50 and the smaller duct orifices 52.1–52.11 may cause some turbulence within the diffusers near their inlets 50. If such turbulence becomes excessive, a complementary transition segment may be added to provide a smoother entry of liquor from the ducts into a diffuser. Such transition segment preferably has an inlet aperture which matches the duct orifice 52 at one end and extends into the diffuser for smooth engagement with its walls.

FIGS. 9 and 10 illustrate another diffuser form for a sedimentation apparatus wherein a stationary submerged center feed mechanism 100 is used. The associated circular settling tank and operating devices have been deleted for clarity. The center feed mechanism 100 includes a supply conduit 102 which terminates in a central feed 104. The center feed extends downwardly with an expanding conical shape to a diffuser section 106.

The conical central feed 104 expands gradually at a flare angle which is sufficiently small to enable the incoming liquor to descend without turbulence to the diffuser section 106. The bottom of central feed 104 is closed.

The diffuser section 106 is formed of a plurality of circumferentially distributed diffusers 108 which are radially oriented to disperse liquor radially about the central feed 104. The diffusers 108 are formed between upper and lower annular plates 110, 112 and radially oriented vertical side walls 114. The angular spacing between side walls 114 is sufficiently small to provide between opposing walls 114 a flare angle α which is small enough to form low turbulence diffusers 108. In the diffuser section 106 the side walls 114 are uniformly distributed about the central axis 116 of the central feed 104 to provide thirty-two diffusers 108, each with a flare angle α of about 11°. The flare angle α may be varied by increasing or decreasing the number of uniformly distributed side walls 114.

The upper annular plate 110 is shown to extend horizontally or transversely to the axis 116. The lower or bottom plate 112, however, is inclined downwardly to form a vertical flare angle α with upper plate 110. With the bottom plate 112 having a downward incline relative to horizontal, any solds which may settle out within the diffusers 108, are advantageously swept away and off the linclined bottom plate 110 by the flow of liquor passing through the diffusers.

In FIGS. 11-14, a plurality of rectangular cross-section diffusers 120 are shown connected to a feed conduit 122 whose end 123 is closed. The liquor enters conduit 122 in the direction indicated by arrow 124 to pass through variable spaced outlets 126 to diffusers 120. The diffuers 120 may have different shapes. Vertical side walls 128 are placed opposite outlets 126 to accommodate local flow conditions and maintain the flare angles α between opposing wall segments within the low turbulence region as bounded by line 72 in the diagram of FIG. 8A.

The diffusers 120 thus each has a flare angle α of generally less than about 30° and a ratio R in a range where the flow regimes for the diffusers is preserved substantially without appreciable stall and turbulence while providing a substantial reduction in the liquor velocity. The entire feed conduit 122 may be moved through a settling tank in a direction as suggested by arrow 129 in FIG. 14.

In FIG. 15 a plurality of diffusers 46 such as described with reference to FIGS. 1-7 are disposed about the periphery of a settling tank 130. The inlets 50 of diffusers 46 are supplied with liquor from a common peripheral trough 132 into which a conduit 134 introduces the liquor with its suspended solids. The diffusers are oriented to direct liquor radially inwardly into the circular settling tank 130.

In FIG. 16 a plurality of diffusers 46 are spaced around the periphery of a settling tank 136. Diffusers 46 in this case are oriented downwardly to introduce liquor near the tank bottom 24 where there is a higher concentration of suspended solids. A weir 138 collects the overflow, while underflow is removed through conduit 34.

Figure 17:
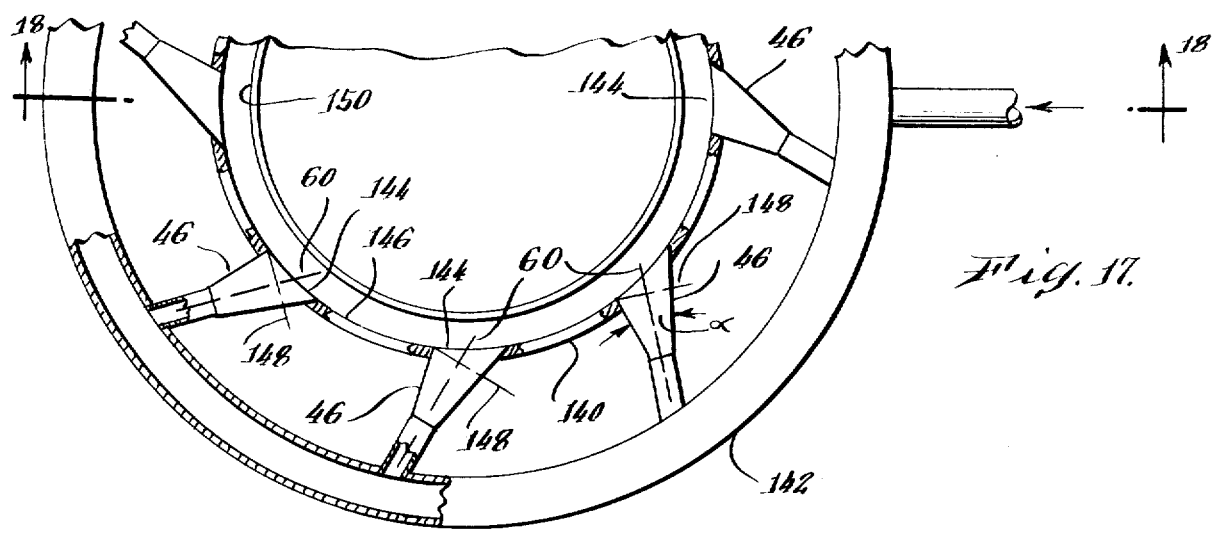
FIG. 17 is a partial plan and section view of a settling tank on which diffusers in accordance with the invention are peripherally employed with an orientation selected to generate a circular flow of the liquor in the tank.
Figure 18:
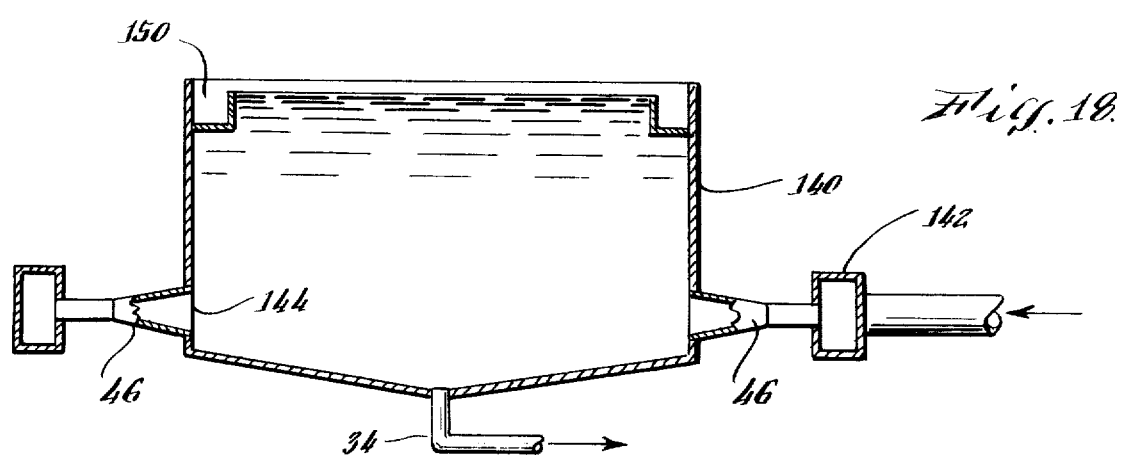
FIG. 18 is a vertical section view of the settling tank of FIG. 17 taken along the line 18—18 therein.

FIGS. 17 and 18 illustrate a circular settling tank 140 wherein a plurality of stationary diffusers such as 46 are spaced around the periphery and supplied with liquor from a surrounding circular conduit 142. The diffusers 46 are similarly oriented at generally the same angle relative to a radial line from the center of tank 140. With the illustrated orientation of diffusers 46, a circular flow pattern of the liquor is produced in tank 140 for enhanced settlement of suspended solids. The diffusers 46 are illustrated with the ends 144 of the diffusers visible by breaking away a portion of the tank wall 146. The diffuser ends 144 are shaped to fit flush with the wall 146 of tank 140. The illustrated shaping of the diffuser ends 144 can be accommodated as long as the diffuser flare angle α and the ratio R for each segment up to a line 148, drawn transversely to the feed direction 60, are within the range needed for low turbulence velocity reduction of the liquor flow. A weir 150 is provided to accept the overflow.

Figure 19:
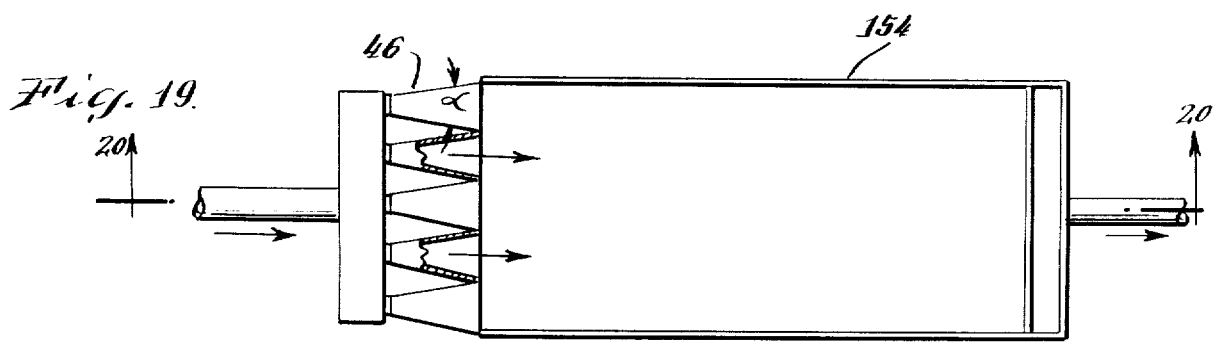
FIG. 19 is a plan view of a rectangular sedimentation apparatus using diffusers in accordance with the invention.
Figure 20:
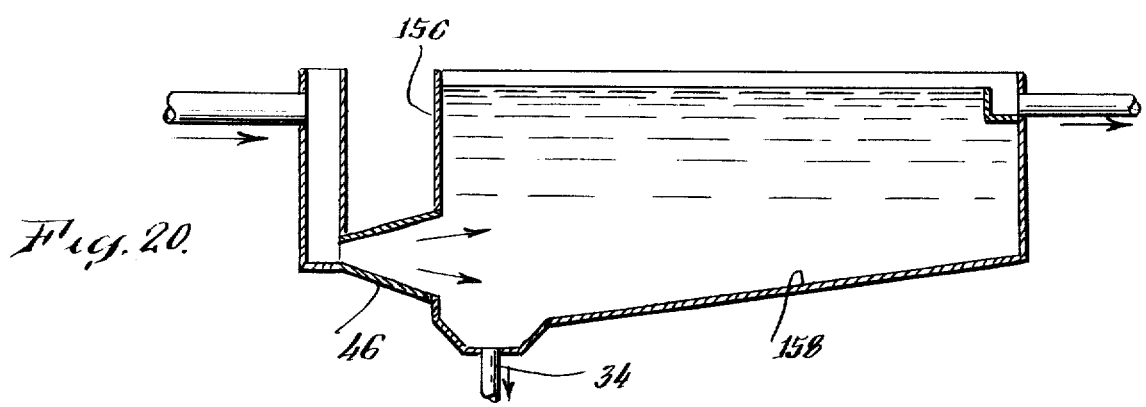
FIG. 20 is a vertical section view taken along the line 20—20 in FIG. 19 of the sedimentation apparatus shown therein.

FIGS. 19 and 20 illustrate a rectangular settling tank 154 with diffusers such as 46 located at one end 156 of the tank 154. The diffusers have the appropriate flare angle α and ratio R to provide a low turbulence introduction into tank 154 near the tank bottom 158.

In FIGS. 21 and 22 a lamella type clarifier 170 is illustrated. Such clarifiers are well known and are characterized by a plurality of parallel spaced apart plates such as 172 usually standing at an angle to the vertical inside a tank 174. Liquor is supplied towards the edges 176 of plates 174 to enable various sized particles to settle out as the liquor passes to a weir 178. The form of the lamella sections may vary and the lamella is shown in FIGS. 21-22 for illustration.

A supply of liquor is introduced through a flocculation compartment 182 in which chemicals can be added to enhance the formation of flocs in the incoming liquor. A diffuser 184 in accordance with the invention interconnects the compartment 182 with the tank 174. The convergence at 186 of the compartment 182 may be replaced with a smooth walled diverging segment. With a diffuser 184 improved flocculation is obtained with clarifier 170.

A diffuser in accordance with the invention can be incorporated as an integral part of a lamella as illustrated in the lamella sections 190, 192 of FIGS. 23-26.

In FIGS. 23, 24, a single lamella section 190 is shown formed by a pair of successively spaced apart upper and lower plates 194-196. It should be understood, however, that a plurality of such lamella sections are likely to be employed arranged in tandem in a manner well known in the art and, as for example, illustrated for the lamella type clarifier of FIGS. 21 and 22. The space between plates 194, 196 is provided, for example, with three diffusers 198.1, 198.2, 198.3. Diffusers 198 are each formed with a lower wall formed by the plate 196 and an upper wall 200 located between the plates 194, 196. The upper wall 200 is shown parallel to plate 196. However, it may have a slight divergence relative to plate 196 thus still in effect remaining parallel thereto. Side walls 202 are used to complete an enclosing wall for diffusers 198. A common feed duct 206 supplies incoming liquor through diffuser inlets 208 into diffusers 198. Note that an upper plate of one lamella section serves as the lower plate for the adjacent lamella section.

The diffusers 198 preferably employ all diverging walls. However, in a lamella configuration, in which a plurality of lamella sections such as 190 are employed in an array, the space limitations limit the divergence between side walls 202. The flare angle α and ratio R of diffusers 198 are as previously described to assure a smooth transfer of incoming liquor from feed duct 206 into the lamella tank (not shown). The passage of incoming liquor is thus as illustrated by arrows 210 with suspended solids including flocs settling out in the direction of arrow 212.

The lamella section 192 employs diffusers 214 wherein one side wall 216 is formed by the wall of a tank (not shown) in which the lamella section 192 is mounted. A different liquor feed arrangement is used with inlets 218 passing through side walls 216.

The lamella sections 190, 192 of FIGS. 23-26 are shown for illustration and variations from these can be made to accommodate other lamella designs. With the incorporation of diffusers such as 198 and 214 as an integral part of a lamella enhanced removal efficiency of a clarifier can be obtained.

For liquors containing suspended solids wherein the flocculent suspension is sensitive to shear conditions, the advantage of this invention can be particularly appreciated. In such case a significant improvement in the effluent quality (milligrams of suspended solids per liter) can be obtained in comparison with conventional liquor feeding arrangements. For example, an improvement of about an average of 30% in effluent (overflow)

clarity was obtained with a diffuser feed arrangement in accordance with the invention in comparison with a baffle type commercial feeding arrangement for a lamella clarifier. This effluent clarity improvement was measured when uranium acid leach tailings are passed through a pilot plant lamella clarifier/thickener similar to the embodiment shown in FIGS. 21, 22.

Having thus described several embodiments of the invention its advantages can be appreciated. Liquor can be introduced in a controlled manner into a settling tank with diffusers of a particular type. The diffusers may be straight or curved provided the velocity of the incoming liquor is reduced and the liquor is introduced into the tank with very low turbulence. In this manner the floc forming process may predominate from the time the liquor is introduced into conduits leading to the settling tank. The invention may be used in various forms and various systems such as where a portion of the dense underflow is recirculated and intermixed with incoming liquor. Such recirculation permits control over the suspended solids concentration of the incoming liquor. Coagulants may be added in special compartments to enhance the formation of flocs which, by use of the invention, may then be advantageously preserved to grow into larger flocs and easier settling in the sedimentation tank.

What is claimed is:

1. In a sedimentation apparatus for the gravitational settling of solids suspended in a liquor which is introduced into a tank from a conduit wherein the improvement comprises
   a diffuser interposed between the conduit and liquor in the tank to guide liquor into the tank along a feed axis, said diffuser being formed with a wall which encloses the feed axis and diverges outwardly from an inlet to a discharge end, said enclosing wall diverging with a flare angle as measured between opposing segments of the wall wherein the flare angle is less than about 30° and the ratio of the length of the enclosing wall to a predetermined cross-sectional dimension of the inlet is in the range between about 1 and about 40, with the flare angle and said ratio being further so selected to maintain within the diffuser a flow regime which is characterized by a liquor flow without appreciable stall, said flare angle and ratio being further so selected to obtain a diffuser discharge end whose cross-sectional area is sufficiently large to achieve a desired reduction of the velocity of the liquor at the discharge end to enable liquid from the diffuser to pass into the tank with a very low level of turbulence.

2. The sedimentation apparatus in accordance with claim 1 wherein the diffuser wall is formed with first and second walls which commence at the inlet and each diverge relative to the feed axis to form a portion of the flare angle relative to the feed axis and wherein the combined portions of the flare angles for both said first and second walls is less than 30°.

3. The sedimentation apparatus in accordance with claim 2 wherein said first and second walls are side walls, with a pair of generally parallel upper and lower walls joining said side walls.

4. The sedimentation apparatus in accordance with claim 3 wherein said diffuser is a portion of a lamella section formed of a pair of spaced apart generally parallel plates with one plate representing said lower wall and with said upper wall being spaced between the spaced apart plates of the lamella section.

5. The sedimentation apparatus in accordance with claim 1 wherein said flare angle and said ratio are selected below a boundary which is defined as a generally straight boundary line drawn on a full logarithmic graph of said flare angle as a function of said ratio wherein the boundary line is drawn between two points defined generally as $\alpha=30°$, $R=1$, and $\alpha=6°$, $R=40$, where $\alpha$ is the flare angle and $R$ is said ratio.

6. The sedimentation apparatus in accordance with claim 1 wherein the diffuser wall is formed of a pair of axially spaced annulr upper and lower plates which extend in radial directions from said conduit to a radially remote discharge end with an axial divergence between the plates to form a flare angle between said plates, and a plurality of generally vertically oriented diffuser side walls extending radially from said conduit, with angularly successive diffuser side walls being selectively angularly spaced to form a flare angle therebetween, wherein the side walls, the upper and the lower plates combine to form a plurality of said diffusers spaced about the conduit.

7. The sedimentation apparatus in accordance with claim 1 wherein the diffuser wall is formed of a pair of vertical side walls and upper and lower walls to form a diffuser of rectangular cross-section, the side walls diverging relative to each other to form a first flare angle and with the upper and lower walls diverging relative to each other to form a second flare angle.

8. The sedimentation apparatus in accordance with claim 1 wherein the diffuser wall is shaped into a cone having a cone angle which represents said flare angle.

9. The sedimentation apparatus in accordance with claim 1 wherein a plurality of lamella sections are formed in said tank, each of said lamella sections being formed by a pair of spaced apart plates, with diffusers being disposed between said plates in the lamella sections to introduce said liquor therein with low turbulence and at a low velocity for enhanced removal of suspended solids by the sedimentation apparatus.

10. The sedimentation apparatus in accordance with claim 9 wherein said diffusers are formed of upper and lower walls with said lower wall being of said spaced apart plates and the upper wall being spaced generally parallel to and between said plates.

11. The sedimentation apparatus in accordance with claim 1 wherein a plurality of diffusers interposed between the conduit and the tank to provide a generally even distribution of liquor throughout said tank.

12. The sedimentation apparatus in accordance with claim 11 wherein said plurality of diffusers are distributed along said conduit within the tank.

13. The sedimentation apparatus in accordance with claim 12 wherein said plurality of diffusers are distributed around the periphery of the tank.

14. The sedimentation apparatus in accordance with claim 13 wherein said diffusers have a common tangential orientation relative to a central axis of the tank to introduce said liquor with low turbulence within the tank with a circular movement of the liquor.

15. The sedimentation apparatus in accordance with claim 11 wherein said conduit is spaced from and surrounds said tank and a plurality of diffusers being distributed around the tank and interconnecting said conduit with the tank to supply liquor thereto with low turbulence and low velocity.

16. A sedimentation apparatus for the gravity settling in a tank of solids suspended in a liquor comprising and inlet for the tank;

a liquid distributing system coupled to the tank inlet and formed with a duct extending radially into the tank;

means for rotating the duct in a circumferential direction about an axis in the tank;

said duct having a plurality of openings facing circumferentially opposite to the direction of rotation;

diffusers mounted on the duct in alignment with said openings thereof to guide liquor into the tank along a liquor feed direction, said diffusers being formed with a fully enclosing wall which diverges outwardly relative to the feed direction from an inlet opposite an opening on the duct to an enlarged end, with the enclosing wall diverging with a flare angle as measured between opposing segments of the wall, wherein the flare angle is less than about 30° and the ratio of the length of the enclosing wall to a predetermined cross-sectional dimension of the inlet is selected to establish a desired liquor velocity reduction at the discharge end and a flow of liquor through the diffuser substantially without appreciable stall and without turbulence tending to break up flocs within the diffuser.

17. The sedimentation apparatus in accordance with claim 16 wherein the duct openings vary in cross-sectional size commensurate with the establishment of a generally even discharge of liquor from said diffusers across the bottom area of the tank.

18. The sedimentation apparatus in accordance with claim 17 wherein the flare angle and said ratio are selected to establish a flow of liquor from the discharge end of the diffuser at a velocity which generally corresponds to the relative velocity of the diffuser with respect to the bottom of the tank.

19. The sedimentation apparatus in accordance with claim 18 wherein said diffusers have a rectangular cross-section.

20. The sedimentation apparatus in accordance with claim 19 wherein said diffusers have a circular cross-section to form a conical diffuser with a cone angle equal to said flare angle.

21. The sedimentation apparatus in accordance with claim 16 wherein said discharge ends of the diffusers are located in proximity to the bottom of the tank to discharge said liquid within the blanket of suspended solids near the tank bottom.

22. The sedimentation apparatus in accordance with claim 21 wherein said diffusers are effectively oriented at a downwardly inclined angle selected to assure discharge of solids settled out within the diffuser.

23. In a method for settling out suspended solids including flocs and primary particles from a liquor into a gravity sedimentation tank where incoming liquor is supplied through a conduit at a first velocity through a diffuser, the improvement comprising the steps of reducing the velocity of the incoming liquor by converting its kinetic energy to a potential energy substantially without appreciable stall and floc breaking shear within the diffuser and establish low turbulence prior to the entry of the incoming liquor into the tank and introducing said liquor into the tank at a velocity which is sufficiently low to enable the incoming liquor to disperse into the liquor in the tank with velocity gradients at levels enabling the process of flocculation to dominate over the process of breaking up of flocs throughout the region of said energy conversion and said introduction of the liquor into the tank.

24. The method for settling out of solids as set forth in claim 23 and further including the step of introducing the incoming liquor within a region of high concentration of suspended solids near the bottom of the tank.

25. The method for settling out of suspended solids in accordance with claim 23 wherein said velocity reducing and liquor introducing steps further include the step of passing said liquor through a diffuser into said tank, wherein said diffuser is formed of an enclosing wall which diverges from an inlet to a discharge opening in communication with the liquor in the tank, said enclosing wall diverging with a flare angle between opposing walls of generally less than about 30°.

26. The method for settling out of suspended solids in accordance with claim 25 wherein said liquor is passed through a plurality of said diffusers into said tank.

27. The method for settling out of suspended solids in accordance with claim 26 wherein said plurality of diffusers are rotated within the tank in a direction opposite to the direction of discharge of liquor from the diffusers into the tank.

28. In a sedimentation apparatus for the gravitational settling of solids suspended in a liquor which is introduced into a tank from a conduit wherein the improvement comprises a diffuser having an inlet and a discharge opening, said diffuser being formed for placement between the conduit and liquor in the tank to guide liquor into the tank along a feed axis, said diffuser further being formed with a wall which diverges outwardly from the feed axis between the inlet and the discharge opening, said wall diverging with a flare angle as measured between opposing segments of the wall, said flare angle and a ratio of the length of the wall to a predetermined cross-sectional dimension of the inlet being so selected to establish within the diffuser a flow regime which is characterized by a liquor flow without appreciable stall with sufficiently low turbulence so as to substantially avoid the break-up of flocs within the diffuser, said flare angle and said ratio being further so selected to obtain a diffuser discharge opening whose cross-sectional area ia sufficiently large to achieve a desired reduction of the velocity of the liquor at the discharge opening to enable liquor for the conduit to pass through the diffuser into the tank with a very low level of turbulence.

29. The sedimentation apparatus in accordance with claim 28 wherein the flare angle is less than about 30°.

30. The sedimentation apparatus in accordance with claim 29 wherein the ratio is generally less than about 40.

31. The sedimentation apparatus in acordance with claim 28 wherein said flare angle and said ratio are selected below a boundary which is defined as a generally straight line drawn on a full logarithmic graph of the flare angle as a function of said ratio wherein the boundary is drawn between two points defined generally as $\alpha = 30°$, $R = 1$ and $\alpha = 6°$, $R = '$, where $\alpha$ is the flare angle and $R$ is said ratio.

32. The sedimentation apparatus in accordance with claim 31 wherein the flare angle $\alpha$ is in the range from about 20° to about 10° and the ratio R is in the range between about 3 and about 10.

* * * * *